Aug. 31, 1926.  
L. P. ERB  
1,597,775  
RESILIENT TIRE  
Filed Dec. 26, 1924   2 Sheets-Sheet 1
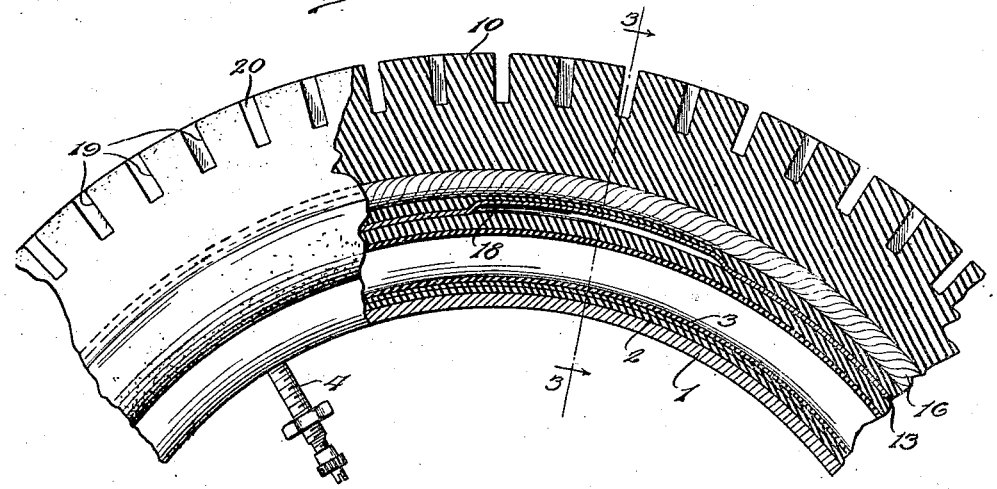
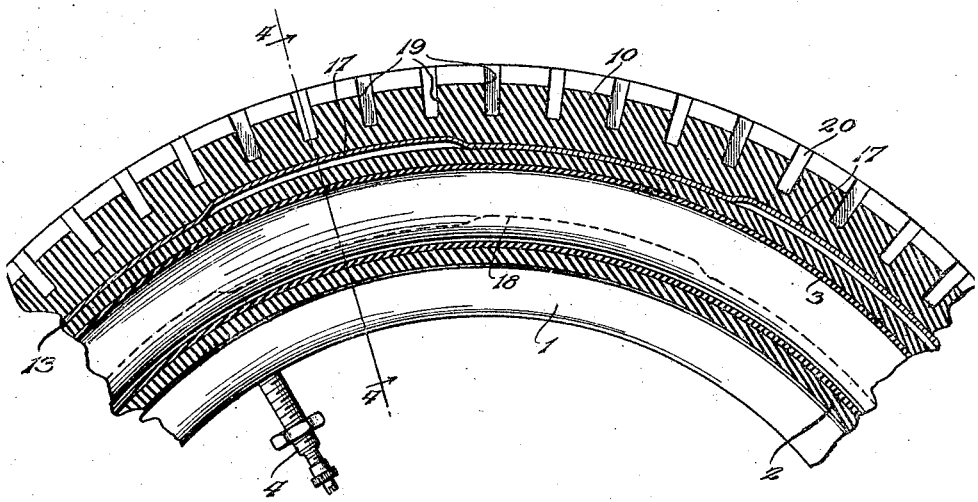
Inventor  
L. P. Erb  
By Lacey & Lacey, Attorneys Aug. 31, 1926.

L. P. ERB 1,597,775

RESILIENT TIRE

Filed Dec. 26, 1924    2 Sheets-Sheet 2

Inventor
L. P. Erb
By
Lacey & Lacey, Attorneys

Patented Aug. 31, 1926.

1,597,775

UNITED STATES PATENT OFFICE.

LANIOUS P. ERB, OF ANACONDA, MONTANA, ASSIGNOR OF ONE-THIRD TO JOE MATELICH, OF ANACONDA, MONTANA.

RESILIENT TIRE.

Application filed December 26, 1924. Serial No. 758,254.

This invention relates to resilient tires and its primary object is to provide a tire which will possess all of the easy riding qualities of the ordinary pneumatic tire without the liability of the same to be punctured. Another object of the invention is to provide a tire of such construction that the tread portion and the air chamber are independently renewable, and creeping of the tread portion will be prevented. A further object of the invention is to provide a construction whereby in the event of the air chamber being ruptured the tread portion of the tire will fit to the rim in such a manner that the lateral expansion of the tire will be minimized and the cutting of the edges of the tire or side portions of the same when the tire is expanded will be avoided. Other objects of the invention will appear in the course of the following description, and the invention resides in certain novel features which will be particularly pointed out in the appended claims.

In the accompanying drawings:

Figure 1 is a view of one embodiment of my invention showing the same partly in side elevation and partly in central longitudinal section;

Fig. 2 is a longitudinal section taken in a plane approximately midway between the center of the tire and the near side thereof;

Figure 3:
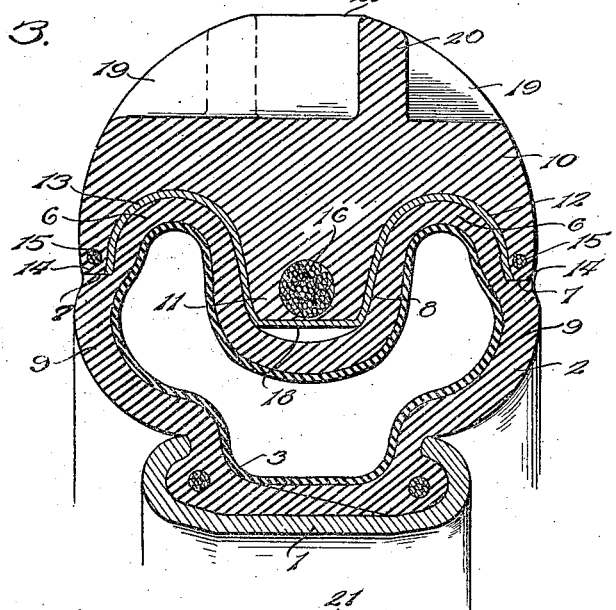
Fig. 3 is a transverse section on the line 3—3 of Fig. 1.
Figure 4:
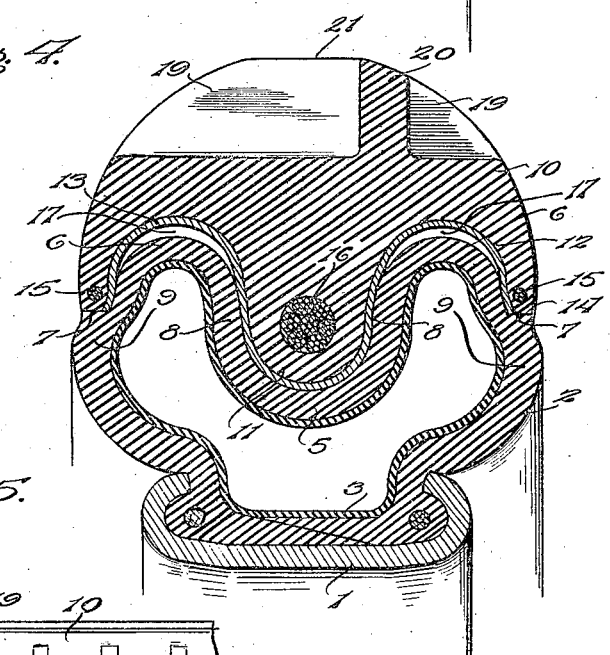
Fig. 4 is a transverse section on the line 4—4 of Fig. 2.
Figure 5:
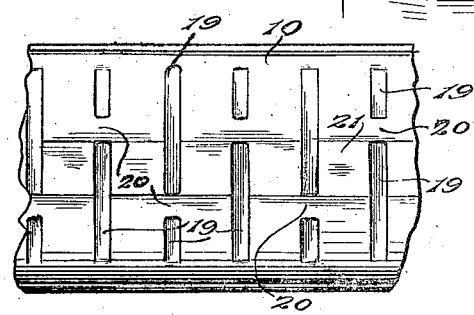
Fig. 5 is a detail plan view of a portion of the tread.

The rim 1 may be of any known or approved design and receives and supports an inner circumferential member comprising an outer casing 2 and an inner inflatable tube 3, the casing 2 being constructed of fabric and rubber or other materials now commonly employed for such purpose and the inner tube being of rubber and equipped with an inflation valve 4 which is fitted through the outer casing and the rim in the usual manner. The outer circumference of the casing is given the ogee formation shown clearly in Figs. 3 and 4, whereby it is provided with a central longitudinal reentrant portion 5 spaced from its side walls and presented toward the rim, as well as outwardly projecting longitudinally extending ribs 6, horizontal shoulders 7 being provided at the bases of the ribs 6 at the outer sides of the same. As shown in Figs. 3 and 4, the inflatable member is substantially U-shaped in cross section with its transverse diameter greater than its radial diameter. The inner sides of the ribs 6 merge into the side portions of the reentrant member 5 through intermediate approximately straight radially extending surfaces or stretches 8, and the side walls are somewhat expanded laterally, as at 9, so as to compress or distend radially to carry weight as the point of contact with the ground varies, avoiding detrimental movement and friction which would otherwise occur in the outer peripheral portion of the casing. Fitted around the inner member, consisting of the casing 2 and the inflatable tube 3, is a tread member comprising a body 10 of rubber or other resilient material, which body is solid throughout its circumferential or longitudinal extent and has its inner circumference shaped to provide a central rib 11, fitting within the reentrant portion 5 of the casing, and grooves 12 receiving the ribs 6. A liner 13 of some hard wear-resisting material, such as light metal, cowhide or other material which cannot be easily penetrated by a nail or the like, is interposed between the inner surface of the tread member and the casing of the inner pneumatic member. This liner, of course, has a transverse conformation corresponding to the inner surface of the tread body and fits closely against the radial portions 8 of the casing. The tread body is provided with flat edge portions 14 resting upon the shoulders 7 of the casing and the liner is shown as terminating at said shoulders. Embedded in the tread body 10, in the process of manufacture, adjacent the edge portions 14 thereof are wires or cables 15 which will preferably be of steel or other practically non-extensible material, and embedded in the central tongue or rib 11 and extending throughout the longitudinal extent thereof is a larger cable 16 which is disposed concentric with the said tongue or rib and is, like the cables 15, non-extensible. These cables serve to resist any tendency of the tread member to expand circumferentially and, therefore, effect a close engagement between the inner pneumatic member of the tire and the outer tread member thereof when the parts are assembled, preventing radial separation when the tire is in use.

The side portions of the liner are offset outwardly at intervals, as shown at 17, whereby recesses or cavities are formed therein so that, when the inner member of the tire is inflated, the portions of the ribs 6 extending across these cavities or recesses will fit somewhat within the same, as shown in Fig. 2, and will thereby effect an interlocking engagement therewith so that creeping of the tread member about the pneumatic member will be prevented. For the same purpose, the central portion of the liner is flattened at intervals, as shown at 18, to present shallow cavities which will receive portions of the central reentrant member 5 of the casing 2. By thus counteracting the tendency of the tread to creep, I may use the tires safely with less inflation than is deemed necessary with previous known tires, and by varying the size of the offsets in proportion to the dimensions of the tire, the air pressure may be easily regulated to obtain the desired resiliency in the tire.

When a wheel equipped with a resilient tire is in use, the weight imposed thereon tends to flatten and compress the tire. To accommodate this pressure, the tire tends to expand laterally and this action produces an undesirable wear upon the tire. To accommodate the radial compression and lateral expansion, I form in the tread of the tire transverse grooves, slots or recesses 19 which open through the side portions of the tread and which do not extend entirely across the tread but are arranged in pairs, each pair consisting of a long member and a short member separated by a bridge or web 20. The pairs of slots or recesses are so disposed that the webs 20 are located alternately at opposite sides of the longitudinal center of the tire and they thereby accommodate the expansion and contraction of the tire without producing any distortion of the tread surface so that the wear is reduced and the life of the tire prolonged. It will also be noted that the central portion of the surface of the tread member is slightly flattened, as shown at 21, this flattening of the tread providing a surface which will tend to cling to the ground and in cooperation with the recesses or slots 19 will grip the surface sufficiently to prevent skidding but without detracting from the easy riding qualities of the tire.

From the foregoing description, taken in connection with the accompanying drawings, it will be readily seen that I have provided a tire which may be inflated so as to obtain all the resiliency of the usual pneumatic tire but will have a tread member of solid form so that it will overcome all ordinary puncturing agencies. The tension members 15 and 16 retain the inner circumference of the tread body in a compressed or restrained condition so that the expansion of the inner pneumatic member will be held to radial lines and the tendency of the said member to expand laterally will serve only to more firmly bind the two sections of the tire together. The radial straight portions 8 of the central member of the outer casing 2 are efficient aids in thus controlling the expansion, and the radially curved portions 9 of the side walls furnish ample material to accommodate the radial movement so that the tire may conform to the surface of the ground without causing cracks in the fabric or open spaces between the tread and the pneumatic casing. Should the inner member of the tire be ruptured from any cause so that the pressure therein is materially reduced, the outer tread member will move radially inward at the point of contact with the ground and the reentrant portion 5 of the casing together with the central rig 11 of the tread body will pass into the space between the beads or flanges of the rim and, consequently, the lateral expansion of the tire will be overcome so that thre will be no cutting of the edge portions of the tire, it being noted that the radial distance between the rim and the rib 11 is less than the distance between the rim and the shoulders 7. The peculiar formation of the opposed surfaces of the pneumatic member and the tread member confines the expansion almost entirely to radial lines so that, when the tire is inflated and is in use, wear upon the side portions of the casing, resulting in side cutting, is practically eliminated.

It will be noted that the side walls of the inflatable member project laterally beyond the edges of the tread member and the pressure within the inflatable member will hold the outer periphery thereof in intimate contact with the inner periphery of the tread member so that the compression and expansion of the inflatable member under stress will occur along radial lines between the rim and the edges of the tread member, the shock of the load being thoroughly absorbed and the side walls of the inflatable member tending to assume straight radial lines at the sides and at points remote from the point of contact with the ground so that the compression is gradual and the life of the tire is prolonged while the easy riding qualities thereof are enhanced. The relative widths of the tread member and of the inflatable member adjacent but radially inward from the tread member are such that the tread member will restrain the outer periphery of the inflatable member and the flexing of the walls of the inflatable member must occur between the tread member and the rim. Moreover, the convolutions presented by the opposed surfaces of the tread member and the inflatable member not only serve to prevent transverse release of the tread member from the inflatable member but also cause the relative movement in the inflatable member to occur along radial lines.

Having thus described the invention, I claim:

1. A resilient tire comprising an inner inflatable member having its outer circumference provided with longitudinal projections extending alternately outwardly and inwardly in radial directions whereby the bore of the member is substantially U-shaped in cross section, a detachable tread member having its inner circumference formed with portions counter to and mating with the projections on the inflatable member, and restraining elements disposed circumferentially within the central and edge portions of the tread member to resist circumferential expansion of the inner circumference thereof whereby to maintain the same in engagement with the inflatable member, the width of the tread member being less than the transverse diameter of the inflatable member on a line adjacent the tread member.

2. A resilient tire comprising an inflatable member provided longitudinally of its outer circumference with a central deep longitudinally extending reentrant portion and outwardly projecting longitudinal ribs at the sides of said reentrant portion, a solid tread member having a central longitudinal rib or tongue fitting within the reentrant portion of the inflatable member and having longitudinal grooved edge portions receiving the ribs on the inflatable member, means for resisting circumferential expansion of the tread member, and a liner between the inflatable member and the tread member conforming to the cross section thereof and having longitudinally spaced recesses receiving portions of the inflatable member when the latter is inflated whereby to prevent relative creeping of the inflatable member and the tread member.

3. A resilient tire comprising an inner inflatable member having its outer circumference provided with a central longitudinal reentrant portion and longitudinal ribs at the sides of said reentrant portion, a non-inflatable tread member having a central rib fitting in the reentrant portion of the inflatable member and longitudinal grooves receiving the ribs on the inflatable member, the said rib and grooves of the tread member having recesses formed therein at intervals longitudinally thereof to receive portions of the outer circumference of the inflatable member under inflation whereby to prevent creeping of the tread member, and means for resisting circumferential expansion of the tread member.

4. A resilient tire comprising an inner inflatable member having a central reentrant portion extending longitudinally of its outer circumference and outwardly projecting longitudinal ribs at the sides of said reentrant portion, and a tread member of less width than the inflatable member having a central rib fitting within the reentrant portion of the inflatable member and longitudinal grooves at the sides of said rib receiving the ribs on the inflatable member whereby the two members will be transversely interlocked, the distance between the central rib of the tread member and the inner periphery of the inflatable member being less than the distance between the edges of the tread member and the inner periphery of the inflatable member and the sides of the inflatable member being laterally expanded between its inner periphery and the edges of the tread member.

In testimony whereof I affix my signature.

LANIOUS P. ERB. [L. S.]